(12) United States Patent
Ochs et al.

(10) Patent No.: US 8,245,542 B2
(45) Date of Patent: Aug. 21, 2012

(54) METHOD FOR PRODUCING A CYLINDER FROM SYNTHETIC QUARTZ GLASS

(75) Inventors: Stefan Ochs, Bad Camberg (DE); Steffen Zwarg, Wolfen (DE); Mirko Wittrin, Sandersdorf (DE); Martin Trommer, Bitterfeld (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 293 days.

(21) Appl. No.: 12/801,378

(22) Filed: Jun. 4, 2010

(65) Prior Publication Data

US 2010/0307197 A1    Dec. 9, 2010

(30) Foreign Application Priority Data

Jun. 5, 2009    (DE) .................... 10 2009 024 267

(51) Int. Cl.
*C03B 37/018*    (2006.01)
(52) U.S. Cl. ................. 65/426; 65/422; 65/427
(58) Field of Classification Search .......... None
See application file for complete search history.

(56) References Cited

U.S. PATENT DOCUMENTS

| | | | | |
|---|---|---|---|---|
| 5,364,433 A * | 11/1994 | Nishimura et al. | ............ | 65/17.4 |
| 2002/0073740 A1 | 6/2002 | Dawes et al. | | |
| 2007/0059534 A1* | 3/2007 | Huenermann | ............... | 428/428 |
| 2007/0277555 A1 | 12/2007 | Hino | | |

FOREIGN PATENT DOCUMENTS

| | | | |
|---|---|---|---|
| JP | 59021536 A | * | 2/1984 |
| JP | 60033226 A | * | 2/1985 |
| WO | WO 2006/082983 A2 | | 8/2006 |

* cited by examiner

*Primary Examiner* — Matthew Daniels
*Assistant Examiner* — Lisa Herring
(74) *Attorney, Agent, or Firm* — Tiajoloff and Kelly LLP

(57) ABSTRACT

A known method for producing synthetic quartz glass comprises the method steps: (a) forming a cylindrical $SiO_2$ soot body having an inner portion and at least one free cylinder jacket surface surrounding the inner portion; (b) thermally drying the porous soot body; and (c) vitrifying the dried soot body with formation of the cylinder from synthetic quartz glass. Starting therefrom, to indicate a method which permits a particularly flat radial distribution in the inner portion of the cylinder, it is suggested according to the invention that the dried $SiO_2$ soot body that is present after method step b) should be subjected to a homogenizing method prior to vitrification, the homogenizing method comprising the following steps: (I) heating the soot body to a consolidation temperature to form a sealing layer in the area of the at least one cylinder jacket, the sealing layer sealing the inner portion to the outside; (II) cooling the soot body from the consolidation temperature; and (III) annealing the soot body in the range of a homogenization temperature during a period of at least 5 hours so that the radial profile of the hydroxyl group concentration flattens in the inner portion.

16 Claims, 1 Drawing Sheet

METHOD FOR PRODUCING A CYLINDER FROM SYNTHETIC QUARTZ GLASS

Figure 1:
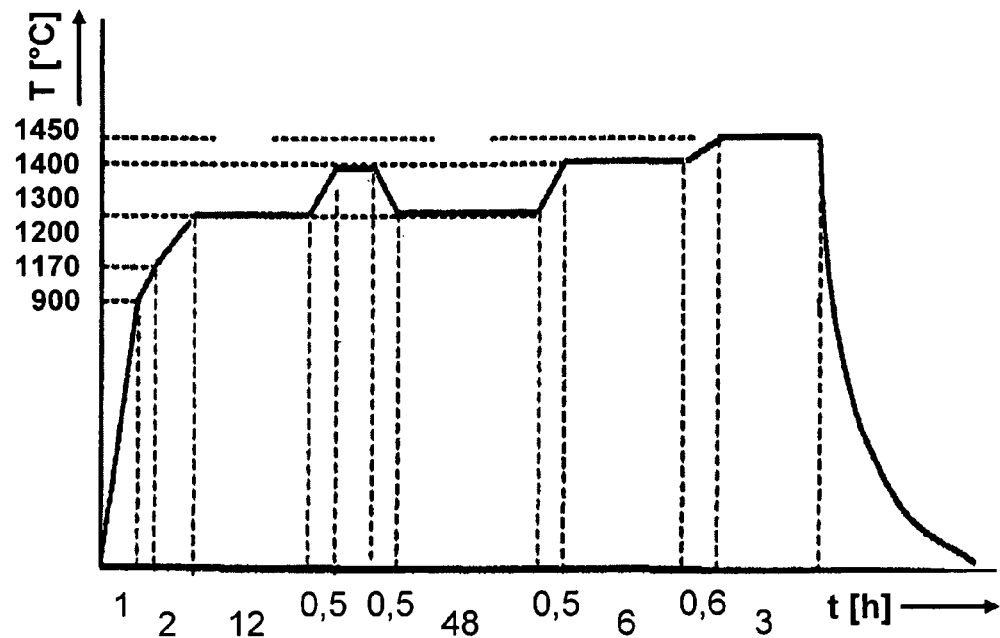

The present invention relates to a method for producing a cylinder from synthetic quartz glass, comprising the following method steps:

(a) forming $SiO_2$ particles by flame hydrolysis or oxidation of a silicon-containing start compound and layerwise deposition of the $SiO_2$ particles on a rotating carrier while forming a cylindrical $SiO_2$ soot body having an inner portion and at least one free cylinder jacket surface surrounding the inner portion;

(b) thermally drying the porous soot body by holding within the range of a drying temperature, in such a way that a predetermined mean concentration of hydroxyl groups and a radial profile of the hydroxyl group concentration with a maximum in the inner portion of the soot body are obtained; and (c) vitrifying the dried soot body with formation of the cylinder from synthetic quartz glass.

TECHNICAL BACKGROUND

Optical components for microlithography or preforms for optical fibers are for instance made from synthetic quartz glass. In the manufacture of the quartz glass a so-called "soot body" of porous $SiO_2$ soot is often obtained as an intermediate product. The soot body forms a layer of porous $SiO_2$ soot, which may e.g. be present in the form of a solid cylinder, a hollow cylinder or as a $SiO_2$ soot coating on a rod or tube of quartz glass or of another material. Such $SiO_2$ layers are e.g. obtained by axial deposition of $SiO_2$ soot according to the VAD (Vapor Axial Deposition) method or by deposition on the cylinder jacket surface of a carrier rotating about its longitudinal axis according to the OVD (Outside Vapor Deposition) method.

The formation of the $SiO_2$ particles in the deposition of the $SiO_2$ soot is normally carried out by hydrolysis or oxidation of a silicon-containing raw material, such as $SiCl_4$, by means of an oxyhydrogen flame. Therefore, due to the manufacturing process the $SiO_2$ soot body contains a great number of hydroxyl groups. These have an impact on the resistance of the quartz glass to short-wave UV radiation, they influence the optical transmission, and they change the refractive index of the quartz glass obtained therefrom.

Therefore, in the manufacture of quartz glass, particular attention is normally paid to the observation of a predetermined mean content of hydroxyl groups. Excessive hydroxyl groups must be removed prior to the vitrification of the $SiO_2$ soot body. Chemical drying processes and thermal drying processes are known to remove hydroxyl groups.

Chemical drying is efficient and fast. It is based on substitution or reaction of the hydroxyl groups with a reagent, for instance chlorine. The synthetic quartz glass dried in this way contains, however, a certain amount of the drying reagent, for instance chlorine or fluorine, and it is known that this may deteriorate the resistance of the quartz glass to UV radiation.

Therefore, the hydroxyl groups must be thermally removed from the $SiO_2$ soot body in applications where the soot body cannot be dried chemically. The thermal drying process is based on diffusion, resulting in a concentration gradient of hydroxyl groups between the inner portion of the drying $SiO_2$ soot body and its free cylinder jacket surfaces.

In the case of quartz glass cylinders used for making lenses or other microlithographic components, a radial distribution of the hydroxyl groups that is as homogeneous as possible is however desired. Ideally, the hydroxyl group content is so uniform over the radius of the quartz glass cylinder that a subsequent and expensive homogenization of the quartz glass is not needed.

US 2002/007347 A1 discloses a method for doping a soot preform with fluorine. The document suggests that a porous $SiO_2$ soot preform should be heated to a temperature above 1200° C. and that the preform should be exposed to a fluorine-containing atmosphere and that the treatment duration and the temperature should be set such that a predetermined radial profile of the fluorine concentration is obtained. As a kind of support, and while the soot body is built up, a barrier layer is produced in the form of a vitrified thin layer within the soot body. During the subsequent treatment in fluorine-containing atmosphere said barrier layer is to reduce the diffusion of fluorine into the inner portion of the soot body so as to ensure a distinct refractive index jump in this portion.

A method for thermally drying a $SiO_2$ soot body in the course of the manufacture of a solid cylinder of quartz glass is known from WO 2006/082983 A2. It is suggested therein that a $SiO_2$ soot body produced according to the VAD method should be presintered at a temperature around 1350° C. while maintaining a porous soot body structure, so that a mean soot density ranging from 0.3 $g/cm^3$ to 0.8 $g/cm^3$ is set. The presintered porous $SiO_2$ soot body is then dried at a temperature of around 1250° C. under vacuum for a period of time of 20 to 100 hours and is subsequently vitrified at a high temperature of around 1750° C. under inert gas. Presintering and subsequent drying of the presintered porous quartz glass body result in a noticeable decrease in the mean hydroxyl group content and also in a homogeneous radial distribution of the hydroxyl group concentration in the finished solid cylinder of quartz glass.

US 2002/0073740 A1 discloses a method for manufacturing a preform having at least one fluorine doped region. A cylindrical soot body is prepared which is doped with fluorine in a doping process. In order to control the radial penetration of the fluorine in the soot body during the doping process it is suggested to generate at least one glassy barrier layer by densification of a thin soot layer.

TECHNICAL OBJECT

Although the known method makes the radial profile of the hydroxyl group concentration uniform to some extent, there is still a distinct gradient between the inner portion and the portion near the cylinder jacket surface. At mean hydroxyl group contents of around 20 wt. ppm, the differences between the maximum in the inner portion of the solid cylinder and the hydroxyl group concentration in the area of the cylinder jacket surface are typically in the range of from 30% to 50% (based on the maximum value).

It is the object of the present invention to provide a method that permits the reproducible manufacture of a cylinder from synthetic quartz glass with a predetermined hydroxyl group content and a particularly flat radial distribution in the inner portion of the cylinder.

Starting from the method of the aforementioned generic type, this object is achieved according to the invention in that the dried $SiO_2$ soot body that is present after method step b) is subjected to a homogenizing method prior to vitrification, the homogenizing method comprising the following steps:

(I) heating the soot body to a consolidation temperature to form a sealing layer in the area of the at least one cylinder jacket, the sealing layer sealing the inner portion to the outside;

(II) cooling the soot body from the consolidation temperature; and (III) annealing the soot body by heating it in the range of a homogenization temperature during a period of at least 5 h so that the radial profile of the hydroxyl group concentration flattens in the inner portion.

The method of the invention includes a modification of the known thermal drying process insofar as the open-pore soot body is first dried thermally to such an extent that a hydroxyl group concentration is obtained in the soot body that conforms to a desired mean hydroxyl group concentration, and that the soot body dried so far is then subjected to homogenization, which results in a flattening of the radial concentration profile and in a flattening of the radial hydroxyl group profile. To achieve such a flattening, the soot body is provided with a sealing layer, as shall be explained in more detail hereinafter.

"Desired mean hydroxyl group concentration" in this context means an amount of hydroxyl groups that with a uniform distribution over the available quartz glass volume would yield the desired hydroxyl group content. This loading with hydroxyl groups conforms to the one as is normally determined by means of standard measuring methods that integrate across the specimen thickness, e.g. as in the spectroscopic measurement of transmitted light.

The thermal drying of the open-pore soot body according to method step (b) is performed in a temperature range or at a temperature at which no sintering or only insignificant sintering of the $SiO_2$ soot occurs. Sintering, as well as an increase in density, is acceptable as long as an adequate diffusion of hydroxyl groups within the soot body is still guaranteed thereafter. This temperature, or this temperature range, shall also be called "drying temperature" in the following. Apart from the drying temperature, the necessary duration of the thermal drying process depends substantially on the thickness of the soot body layer to be dried, the soot density, the initial hydroxyl group content and the mean hydroxyl group content to be achieved.

In contrast to the known method, a further temperature treatment of the soot body that comprises at least three method steps and makes the concentration profile uniform within the soot body is intended in the invention after completion of the thermal drying process.

(I) To this end the soot body is heated in a first homogenization step to a temperature higher than the drying temperature, so that the cylinder jacket of the porous soot body is consolidated or densified. This is e.g. accomplished by heating to a comparatively high temperature for a short time or by holding within a range around the comparatively high temperature for a short period.

This comparatively high temperature or the range around the comparatively high temperature shall also be called "consolidation temperature" hereinafter.

It is here essential that a vitreous sealing layer is formed on the cylinder jacket, the sealing layer being substantially impermeable to hydroxyl groups. The essential function of the sealing layer consists in sealing the inner portion of the soot body to the outside. It is enough in the case of a soot body in the form of a solid cylinder when the outer jacket of the cylinder is provided with the sealing layer. In a tubular soot body having its inner cylinder jacket surface closely adjoining a carrier body, e.g. a quartz glass tube or a quartz glass rod, it is also enough when the outer jacket of the cylinder is provided with the sealing layer. By contrast, in a tubular soot body with a free inner jacket of the cylinder, it is required for the sealing of the inner portion that both the outer jacket of the cylinder and the inner jacket of the cylinder should be provided with a sealing layer. A sealing of the inner portion at the front side is not needed.

(II) After sealing of the inner portion by forming the sealing layer or the sealing layers the soot body is cooled in a second homogenization step from the consolidation temperature to a lower temperature that is distinguished in that it permits the diffusion of hydroxyl groups in the quartz glass, but no further sintering or only a slight sintering occurs (in this instance, too, a relative increase in density by a few percent is acceptable on condition that an adequate diffusion of hydroxyl groups within the soot body is still guaranteed). This lower temperature or the range around the lower temperature shall also be called "homogenization temperature" in the following. The homogenization temperature corresponds e.g. to the drying temperature.

(III) In a third homogenization step, the still open-pore soot body that is now however sealed with the sealing layer to the outside is annealed at the homogenization temperature.

Prior to annealing the radial concentration profile of the hydroxyl groups shows a pronounced maximum in the inner portion of the soot body that steeply drops to the outside. The hydroxyl groups show a sufficiently high mobility inside the open-pore inner portion of the soot body during annealing, so that the concentration gradient is gradually getting flatter and flatter due to diffusion. This flattening is accomplished in that, in contrast to method step (b), the hydroxyl groups do not overcome the barrier of the sealing layer during homogenization and can thus not exit to the outside. As a result, in the method of the invention near-surface portions are again enriched with hydroxyl groups. In the final analysis homogenization does thus not lead to a further drying of the soot body, but accomplishes an uniformization of the radial concentration gradient.

Such uniformization will be the more pronounced the longer the third homogenization step lasts. Ideally (after a theoretically infinitely long annealing period), a constant hydroxyl group concentration is obtained across the radius. The degree of uniformization of the radial profile of the hydroxyl group concentration depends on the radial dimension (thickness) of said inner portion and on the soot density in the inner portion. Generally, at low requirements on uniformization, a heating time of 5 hours is sufficient. If the heating time during annealing is less than 5 h, no considerable and effective flattening of the radial profile of the hydroxyl group concentration in the inner portion can be achieved.

After the homogenizing process has been completed, the soot body is vitrified in the standard way according to method step (c) to obtain a solid cylinder of synthetic quartz glass.

In an advantageous configuration of the method, it is provided that thermal drying of the porous soot body comprises holding within the range of a drying temperature between 1200° C. and 1320° C., preferably at not more than 1300° C., under vacuum.

This temperature range represents an optimum with respect to a drying process that is as efficient as possible within a short period of time. Drying temperatures in this range effect, on the one hand, an adequately high mobility of the hydroxyl groups, thereby permitting a rapid drying of the soot body to the desired hydroxyl group level. On the other hand, the temperature is low enough to prevent a dense sintering of the soot body within standard treatment durations. The application of a vacuum (<0.01 mbar) is desired and accelerates the drying process.

Due to drying a typical diffusion profile of the hydroxyl group concentration is obtained that is distinguished by a pronounced maximum in the inner portion of the soot body with concentrations dropping towards the free jacket surface of the cylinder. The drying process will be completed as soon as the amount of the hydroxyl groups remaining in the soot body is so great that with a theoretically uniform distribution over the whole soot body volume a predetermined value for a "mean hydroxyl group content" is obtained. Values predetermined for the "mean hydroxyl group content" are typically within the range of 5 to 200 wt. ppm.

It has turned out to be advantageous when the soot body has a mean density of not more than 30% of the density of quartz glass at least at the beginning of the drying phase.

A mean density of more than 30% results in a long treatment duration for drying the soot body. Soot bodies having a mean density below 15% of the density of quartz glass are mechanically less stable and thus difficult to handle.

After drying the sealing layer is formed. The formation of the sealing layer preferably comprises heating the soot body to a consolidation temperature in the range of 1350° C. to 1450° C.

The heating of the soot body to temperatures within said temperature range leads within a sufficiently short time to the formation of a dense sealing layer in the area of the at least one cylinder jacket surface. A sealing layer is here regarded as a layer that has a density in the range of 90% to 100% of the density of quartz glass (2.21 g/cm$^3$) at least over a thickness of 0.5 mm. It is the function of the sealing layer to prevent the passage of $H_2O$ during subsequent annealing. This function is already sufficiently satisfied at very small layer thicknesses of dense quartz glass, but is all the better the thicker and denser the sealing layer is. On the other hand, the portion of the sealing layer may represent material waste, so that a thickness that is as small as possible is desired, especially since in cases where only a thin sealing layer is formed, the temperature load on the soot body on the whole as well as superfluous consolidation of the inner portion are also avoided.

To keep the temperature load on the inner portion of the soot body as small as possible, despite the formation of an adequately dense and thick sealing layer, heating to the consolidation temperature is carried out within a short period of time of less than 60 min.

Due to the comparatively small thermal conductivity of $SiO_2$ the temperature load on the soot body can be restricted by short-term heating substantially to the near-surface portion, which is enough for the formation of a sealing layer that is as thin as possible, but adequately dense.

Especially with comparatively low sealing temperatures, the generation of the sealing layer preferably comprises a holding of the soot body at the consolidation temperature for a period of 30 min to 120 min.

The soot body is here kept at an increased temperature (consolidation temperature) for a relatively short period of time for forming a sufficiently thick and dense sealing layer. This facilitates the reproducible formation of a defined thickness and density of the sealing layer.

Like the heating to the consolidation temperature, the cooling of the soot body from the consolidation temperature to the homogenization temperature also takes place within a short period of time of less than 60 min.

On the whole, a heating to consolidation temperature that is as short as possible is accomplished for the formation of the sealing layer. As a result, a dense sealing layer with a small thickness is obtained, whereas the inner portion of the soot body remains open-pored and permits the diffusion of hydroxyl groups during subsequent annealing.

The sealing layer is preferably made as thin as possible and as thick as needed. Preferably, the sealing layer has a density ranging between 90% and 100% of the density of quartz glass and a layer thickness in the range of 0.5 mm to 5 mm.

In the finish-vitrified soot body the sealing layer forms an outer cylinder jacket layer that differs in its chemical properties from the vitrified inner portion and that, depending on the requirements made on the homogeneity of the vitrified solid cylinder in the rim portion, must be discarded. Therefore, the layer thickness of the sealing layer is preferably small.

The temperature treatment of the soot body for forming the sealing layer does not significantly change the typical diffusion profile of the hydroxyl group concentration, as has been obtained after drying. The profile still comprises a pronounced maximum in the central region of the soot body with outwardly rapidly decreasing concentrations.

The soot body provided with the sealing layer is subsequently annealed. The annealing process serves to flatten the radial profile of the hydroxyl group concentration. To this end a diffusion of the hydroxyl groups must be possible. However, it has turned out to be advantageous in this context when the annealing comprises a holding of the soot body within the range of a homogenization temperature between 1200° C. and 1320° C., preferably at not more than 1300° C.

A homogenization temperature in the said range guarantees, on the one hand, a high mobility of the hydroxyl groups; on the other hand, it is not high enough to effect a dense sintering of the soot body within a short period of time, which would either prevent further diffusion or make it noticeably difficult, so that an adequate flattening of the hydroxyl group concentration profile would not be achievable within economically reasonable periods.

It has here turned out to be particularly useful when the soot body is held within the range of the homogenization temperature for a holding period of at least 10 h, preferably in the range of 24 h to 60 h.

The holding period at the homogenization temperature (or within the range of the homogenization temperature) depends substantially on the desired degree of the flattening of the hydroxyl group concentration profile—apart from the outer diameter of the soot body. The sealing layer has the effect that during annealing in the course of the holding period no hydroxyl groups or an insignificantly small number of hydroxyl groups (in the form of $H_2O$) diffuse out to the outside out of the soot body, thereby preventing a further drying of the soot body below the predetermined and desired mean hydroxyl group content. Instead of this, the diffusion process compensates the concentration profile within the porous inner portion.

To permit and maintain a high mobility of the hydroxyl groups in the inner portion of the soot body, it has turned out to be useful when the inner portion of the soot body has a mean density of not more than 35% of the density of quartz glass at least at the beginning of the annealing process according to homogenization step (III).

The dried and homogenized soot body is preferably isothermally heated for vitrification.

To this end the soot body is introduced into a vitrification furnace and uniformly heated therein—over its whole length (i.e. not in zones).

Vitrification of the dried and homogenized soot body preferably comprises presintering at a presintering temperature for a holding period of at least 1 h and sintering at a sintering temperature, the presintering temperature being at least 50° C. lower than the sintering temperature.

It has therefore turned out to be advantageous when the temperature gradient during vitrification is as uniform as possible over the diameter of the soot body. The best way to accomplish this is a slow heating to the vitrification temperature (or to the vitrification temperature range) or by way of the said presintering process.

DETAILED DESCRIPTION OF THE INVENTION

Figure 2:
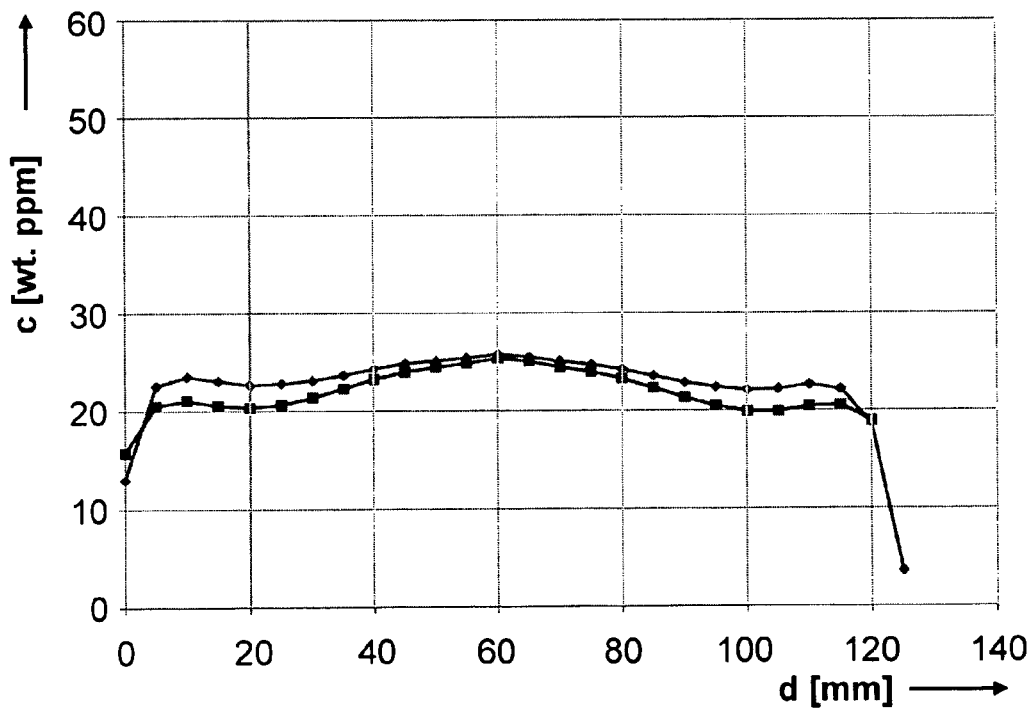

The invention shall now be explained in more detail with reference to an embodiment and a drawing, in which:

FIG. 1 shows a temperature/time profile for drying, homogenizing and vitrifying a soot body according to the invention; and FIG. 2 shows profiles of the hydroxyl group concentration over the diameter of two quartz-glass cylinders obtained according to the method of the invention.

$SiO_2$ soot particles are formed in an oxyhydrogen burner by flame hydrolysis of $SiCl_4$ and are deposited by means of the VAD method on the front side of a rotating substrate body. A solid cylinder of $SiO_2$ soot is formed with a mean density of about 20% of the density of quartz glass and with a mean hydroxyl group content of about 800 wt. ppm (without $H_2O$ adsorbed on the surface). The soot body has an outer diameter of 260 mm.

The soot body is subsequently subjected to a temperature treatment, the temperature/time profile of which is shown in FIG. 1. The treatment duration of the treatment steps "t" in hours is plotted on the x-axis and the temperature "T" in ° C. on the y-axis.

Drying

The soot body is first dried to remove the hydroxyl groups introduced due to the manufacturing process. To this end the soot body is introduced in vertical orientation into a dehydration and vitrification furnace and is treated at a drying temperature of about 1300° C. first in a scavenging process and then under vacuum (0.01 mbar) for a period of 12 hours. This yields a typical radial diffusion profile of the hydroxyl groups that shows a pronounced maximum in the central region of the soot body with a concentration rapidly dropping outwards. The drying treatment will be finished as soon as a hydroxyl group level has been reached that corresponds to a mean hydroxyl group content of 20 ppm in the case of an integral contemplation (averaged over the whole volume of the soot body).

Producing a Sealing Layer

The soot body as predried in this way is subsequently provided with a sealing layer. To this end it is heated from the drying temperature within 0.5 h to a consolidation temperature of 1400° C., it is held at said temperature for one hour and is subsequently cooled again within a period of 0.5 h to a homogenization temperature of 1300° C. (corresponds to the drying temperature).

This treatment produces a dense sealing layer with a thickness of about 1 mm on the cylinder outer jacket surface of the soot body, where thickness of the sealing layer stands for a range that has a relative density of 90% to 100% of quartz glass. This short temperature treatment has hardly any influence on the mean density and the concentration profile of the hydroxyl groups in the central region of the soot body (inner portion); the mean relative soot density in the inner portion of the soot body is thus about 25% (based on the density of quartz glass).

Homogenization

After cooling to the homogenization temperature of 1300° C. the soot body is subjected to a homogenization treatment to flatten the radial hydroxyl group concentration profile. To this end the soot body is further kept at the homogenization temperature in the same furnace, namely for a period lasting for 48 hours.

During this period the hydroxyl groups diffuse within the inner portion of the soot body predetermined by the sealing layer, thereby effecting a flattening of the diffusion profile towards a constant hydroxyl group concentration over the whole diameter of the inner portion.

Two radial hydroxyl group concentration profiles obtained in this way are shown in FIG. 2 (wherein the illustrated profiles have only been measured after vitrification of the soot body). The hydroxyl group concentration "c" is plotted in wt. ppm on the y-axis, and the thickness "d" of the vitrified solid cylinder is plotted in mm on the x-axis. The measurement values are obtained by measuring the IR absorption according to the method of D. M. Dodd et al. ("Optical Determinations of OH in Fused Silica", (1966), page 3911).

Each of the profiles shows a weakly pronounced concentration maximum of around 25 wt. mm, which is first slowly dropping towards the rim to about 22 to 23 wt. ppm and then rapidly to much lower concentration values. This yields an almost constant hydroxyl group concentration over the whole inner portion. The distinct decrease in the hydroxyl group concentration in the rim portions is based on the comparatively low hydroxyl group contents in the sealing layer.

Vitrification

After homogenization the soot body is heated up in the same furnace over its whole length (isothermally) to a temperature of 1400° C. within 0.5 h and is kept at said temperature for six hours. This "presintering" makes the temperature uniform across the soot body and effects a certain consolidation or densification that is subsequently completed by slow heating to a temperature of 1450° C. for a holding time of 3 hours.

A solid cylinder with a diameter of 125 mm is thereby obtained, the solid cylinder being distinguished by the particularly homogenous concentration profile of the hydroxyl groups, as shown in FIG. 2.

In an alternative procedure a tubular soot body is produced by means of an OVD method by depositing $SiO_2$ particles on a carrier, the carrier is removed and the tubular soot body is subjected to a temperature treatment, as shown in FIG. 1. This yields a hollow cylinder of synthetic quartz glass. Solid cylinders that are distinguished by a hydroxyl group concentration profile conforming to the ones shown in FIG. 2 can be obtained from the hollow cylinder by drilling out in the direction of the longitudinal axis of the cylinder.

The invention claimed is:

1. A method for producing a cylinder of synthetic quartz glass, said method comprising the following method steps:
    (a) forming $SiO_2$ particles by flame hydrolysis or oxidation of a silicon-containing start compound and layerwise deposition of said $SiO_2$ particles on a rotating carrier so as to form a cylindrical $SiO_2$ soot body having an inner portion and at least one free cylinder jacket surface surrounding the inner portion;
    (b) thermally drying the porous soot body by holding said porous soot body within a range of a drying temperature in such a way that a predetermined mean concentration of hydroxyl groups and a radial profile of the hydroxyl group concentration with a maximum in the inner portion of the soot body are obtained; and
    (c) vitrifying the dried soot body so as to form the cylinder of synthetic quartz glass,
    wherein the dried $SiO_2$ soot body that is present after method step (b) is subjected to a homogenizing method prior to said vitrifying, the homogenizing method comprising the following steps:

(I) heating the soot body to a consolidation temperature to form a sealing layer in an area of the at least one cylinder jacket surface, the sealing layer sealing the inner portion to the outside;

(II) cooling the soot body from the consolidation temperature; and (III) annealing the soot body by heating it in a range of a homogenization temperature during a period of at least 5 h so that the radial profile of the hydroxyl group concentration flattens in the inner portion.

2. The method according to claim 1, wherein thermal drying of the porous soot body comprises holding within the range of the drying temperature between 1200° C. and 1320° C. under vacuum.

3. The method according to claim 2, wherein the drying temperature is not more than 1300° C.

4. The method according to claim 1, wherein the soot body has a mean density of not more than 30% of the density of quartz glass at least at the beginning of the drying process.

5. The method according to claim 1, wherein forming the sealing layer comprises heating the soot body to the consolidation temperature in a range of 1350° C. to 1450° C.

6. The method according to claim 5, wherein heating to the consolidation temperature is carried out within a short period of time of less than 60 min.

7. The method according to claim 1, wherein forming the sealing layer comprises holding the soot body at the consolidation temperature for a period of time of 30 min to 120 min.

8. The method according to claim 1, wherein cooling the soot body from the consolidation temperature to the homogenization temperature takes place within a short period of time of less than 60 min.

9. The method according to claim 1, wherein a sealing layer is formed that has a density ranging between 90% and 100% of the density of quartz glass over a layer thickness ranging between 0.5 mm to 5 mm.

10. The method according to claim 1, wherein homogenization comprises holding the soot body within the range of the homogenization temperature between 1200° C. and 1320° C.

11. The method according claim 10, wherein the homogenization temperature is not more than 1300° C.

12. The method according to claim 1, wherein the annealing of the soot body comprises a holding period of at least 10 h in the range of the homogenization temperature.

13. The method according to claim 12, wherein the holding period is in a range of 24 h to 60 h.

14. The method according to claim 1, wherein the inner portion of the soot body has a mean density of not more than 35% of the density of quartz glass at least at the beginning of the annealing process according to homogenization step (III).

15. The method according to claim 1, wherein the dried and homogenized soot body is isothermally heated for vitrification.

16. The method according to claim 1, wherein vitrification of the dried and homogenized soot body comprises presintering at a presintering temperature for a holding period of at least 1 h and sintering at a sintering temperature, the presintering temperature being at least 50° C. lower than the sintering temperature.

* * * * *